Nov. 5, 1940.　　　　　J. L. JONES　　　　　2,220,737
APPARATUS FOR DETECTING WEB ALIGNMENT
Filed May 5, 1937　　　　3 Sheets-Sheet 1
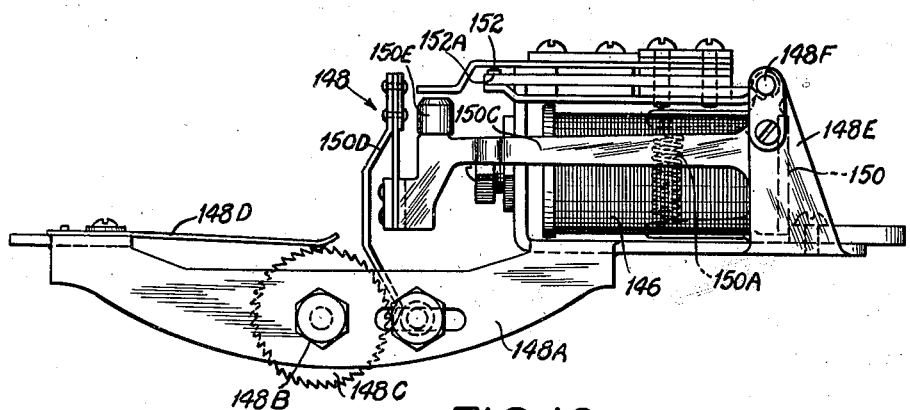
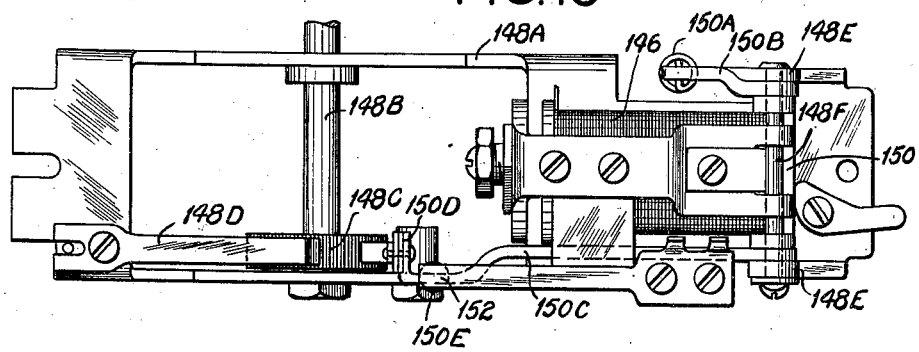
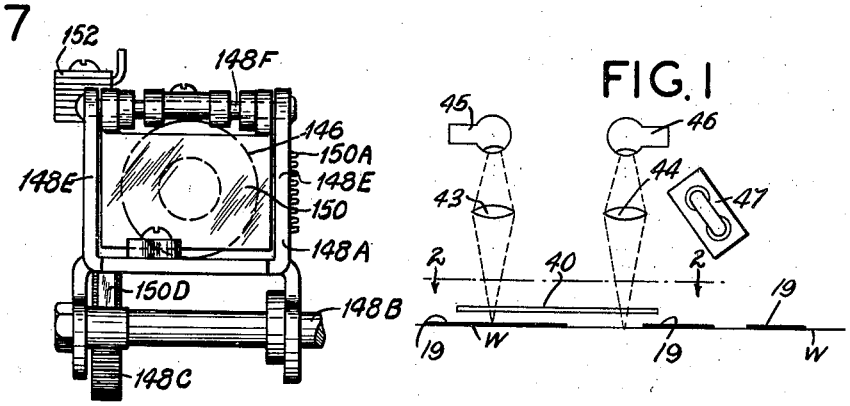

Nov. 5, 1940.  J. L. JONES  2,220,737
APPARATUS FOR DETECTING WEB ALIGNMENT
Filed May 5, 1937  3 Sheets-Sheet 2
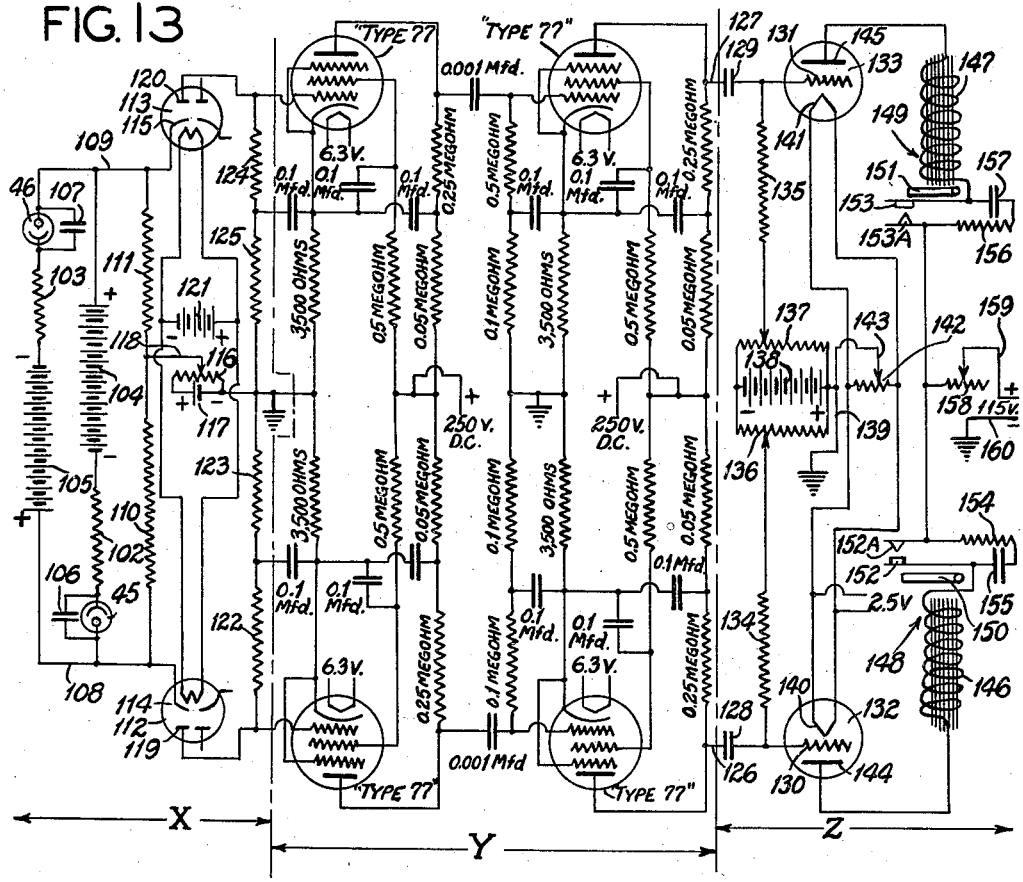
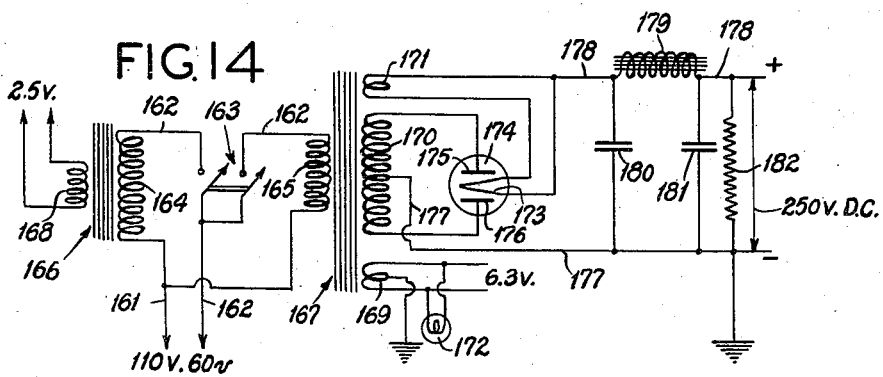
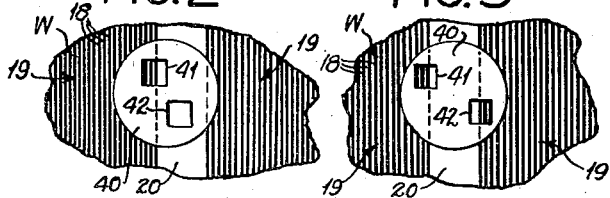
John L. Jones,
Inventor,
Delos G. Haynes,
Attorney.

Nov. 5, 1940.     J. L. JONES     2,220,737
APPARATUS FOR DETECTING WEB ALIGNMENT
Filed May 5, 1937     3 Sheets-Sheet 3
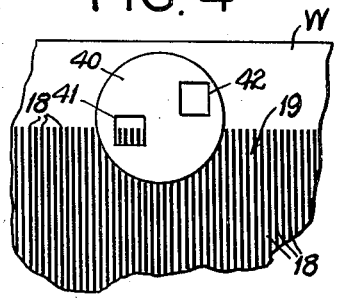
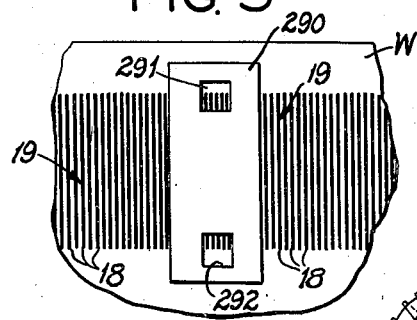
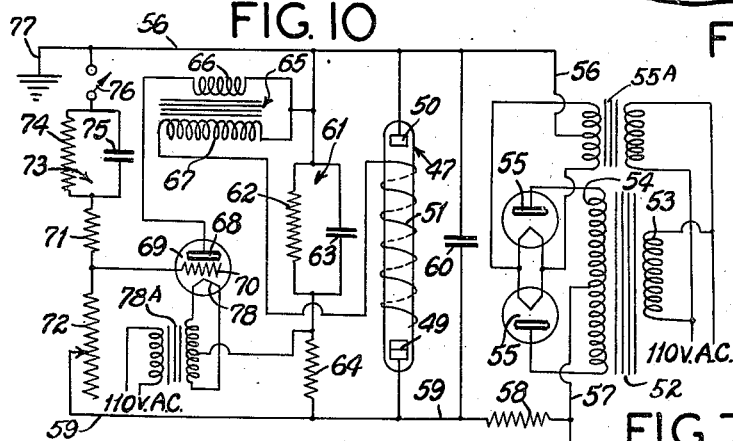
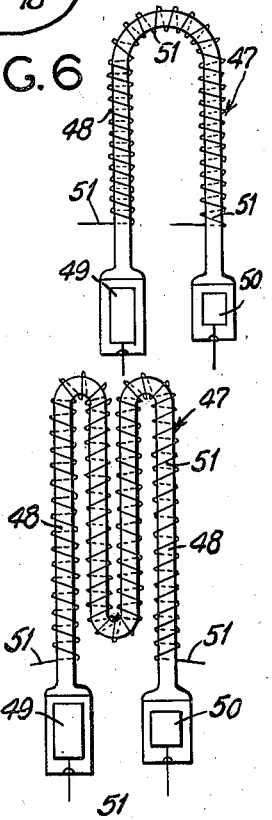
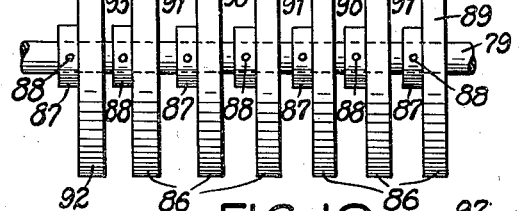
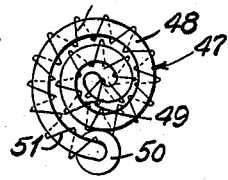
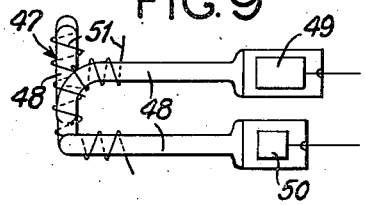

Patented Nov. 5, 1940

2,220,737

UNITED STATES PATENT OFFICE 2,220,737

APPARATUS FOR DETECTING WEB ALIGNMENT

John L. Jones, North Billerica, Mass., assignor to Stockton Profile Gauge Corporation, Lowell, Mass., a corporation of Massachusetts Application May 5, 1937, Serial No. 140,998

4 Claims. (Cl. 88—14)

This invention relates to apparatus for determining or detecting the alignment or misalignment of webs made of materials such as paper and the like, as they pass through a machine performing an operation on such webs, such as a printing press.

Objects of the invention

Among the several objects of the invention may be noted:

The provision of apparatus for detecting web alignment which interposes no mechanical obstruction to the movement of the web;

The provision of apparatus for detecting web alignment which is capable of accurate operation at web speeds up to and exceeding six hundred feet per minute, as encountered in modern high-speed rotary presses;

The provision of apparatus for detecting web alignment both lateral and longitudinal relative to the movement of the web;

The provision of apparatus for detecting web alignment which operates upon actuation by predetermined index positions, or abnormalities thereof, of periodically repeating patterns upon the web, which patterns may comprise either printed regions normally contained on the web, or specially provided patterns, or both;

The provision of web alignment detectors operating upon optical principles, wherein detection is made of the normality or abnormality in position of a periodically repeating pattern upon the web;

The provision of web alignment detectors operating upon stroboscopic illumination principles, in which a periodically repeating pattern on the web is stroboscopically illuminated at times determined by the proper periodicity of the pattern, so that the main motion of the web is optically eliminated and only abnormal motions or misalignments are observed;

The provision of web alignment detectors including photoelectric observing means for abnormalities in alignment of the web;

The provision of web alignment detectors which operate by photoelectric impulses received upon stroboscopic illumination of a periodically repeating pattern on a moving web, in such manner that the said photoelectric impulses are balanced as long as alignment is maintained, but become unbalanced whenever misalignment is encountered, the direction of unbalance being determined by the direction of misalignment; and The provision of apparatus of the class described which is relatively simple and economical in construction and in operation.

Other objects will be in part obvious and in part pointed out hereinafter.

The invention accordingly comprises the elements and combinations of elements, and features of construction and operation and arrangements of parts, which will be exemplified in the structures hereinafter described, and the scope of the application of which will be indicated in the following claims.

The drawings

Referring now more particularly to the accompanying drawings, in which are illustrated several of the various possible embodiments of the invention, Fig. 1 is a diagram of an optical system for a preferred longitudinal alignment detector;

Fig. 2 is a cross-section taken substantially along line 2—2 of Fig. 1, and shows a mask in position over a web;

Fig. 3 is a view similar to Fig. 2, illustrating an alternative disposition;

Fig. 4 is a fragmentary plan view showing a mask on a web, arranged for lateral alignment detection;

Fig. 5 is a view similar to Fig. 4, illustrating another form of mask;

Fig. 6 is a front elevation of a stroboscopic light source;

Figures 7 and 8 are front elevations of alternative shapes of stroboscopic light sources;

Fig. 9 is a side elevation of the stroboscopic light source shown in Fig. 8;

Fig. 10 is an electrical circuit for supplying power to a stroboscopic light source;

Fig. 11 is a side elevation of a stroboscopic timing device;

Fig. 12 is an end elevation of the device of Fig. 11;

Fig. 13 is an electrical circuit for use in conjunction with the preferred longitudinal alignment detector, as indicated in Fig. 1;

Fig. 14 is an electrical circuit diagram of a power supply for the circuit of Fig. 13;

Fig. 15 is a side elevation of an exemplary ratchet motor;

Fig. 16 is a top plan view of the ratchet motor of Fig. 15; and

Fig. 17 is an end elevation of the ratchet motor of Fig. 15.

Similar reference characters indicate corresponding parts throughout the several views of the drawings.

General description of press and preferred control system

With modern high-speed rotary printing presses, the problem of direction control of the moving paper or other web upon which the printing is being done is a difficult one. By direction control of the web is meant the directing and guiding of the web in such manner that each portion of the web reaches the proper location on the plate which is doing the printing at the proper time, so that the printed matter will appear on the web at the proper position with respect to subsequent further printing, cutting, trimming, binding, and like operations. In order to control the placement of the web, not only must it be guided against lateral displacement from a desired course, but it must also be carried forward in such a manner that it suffers no relative displacement longitudinally, or in the direction of its travel. In single press operations, longitudinal displacement is ordinarily of importance only with respect to cutting and trimming and like operations, but with multiple press operations, such as multicolor printing, and the like, longitudinal alignment of the web is of equal importance with lateral alignment. With single and multiple press operations where the press delivers into an automatic cutting or trimming machine, longitudinal as well as lateral control of the web is important in order that the cutting and the like may take place at exactly the proper position with respect to the printed matter.

Attempts have heretofore been made to control the position and location of the moving web through a printing press by means of mechanical feelers and like elements which engage the moving web itself. However, the easy tearing and breaking character of paper, which is the material of which the web is usually composed, makes such control methods in general unsatisfactory, since the feelers or like mechanism all too easily tear the web. This is particularly true when the web travels at the high speeds encountered in modern rotary presses, such as six hundred feet per minute. Further, the inertia of such mechanical web control means makes it substantially impossible for them to respond with sufficient speed to abnormalities in position of the web, and corrective movements, if they are applied at all, are applied only after such a delay that considerable wastage of web material is brought about in the meanwhile.

Optical methods of web control are in general more satisfactory, since they depend upon light phenomena, which have no inertia, and are thus responsive with greater speed to an abnormality in the web position. Further, the light rays used for detection of abnormalities in position of the web offer no mechanical or other obstruction to the movement of the web, and cannot tear or otherwise disfigure the web, as is the case with mechanical feelers and the like.

However, up to the present time, no optical web control mechanisms have been provided which are capable of controlling the moving web with desired accuracy, particularly at relatively high press speeds. The present invention is, so far as we know, the first provision of such optical control systems.

The present invention, in its broader aspects, is applicable not only to the alignment of webs passing through printing presses, but to webs passing through machinery which performs operations on the web in accordance with certain dimensional characteristics thereof, such as cutters, trimmers, folders, and the like. However, in order to simplify the explanation of the present invention, it will be described principally in its application to printing presses.

Basically, the system or method provided by the present invention for the purpose of lateral or longitudinal alignment of a moving web comprises optically detecting whether or not a predetermined part of a periodically repeating pattern on the web is in a predetermined index position at a predetermined time relative to the beginning of the cycle in which the detection takes place, determining whether any displacement of the predetermined part of the web pattern from the predetermined index position is positive or negative such as to the right or to the left, or ahead or behind, for example, and producing an electrical signal or controlling the flow of electric current in the circuit of a correcting means in accordance with the algebraic sign of the displacement if there is a displacement at the time of the detection. The alignment of the web may then be corrected with apparatus of known type, outside the scope of the present invention, in accordance with the signal developed by the detector. The above described detection may be repeated either during each successive cycle or during a majority of cycles at predetermined equal relative times after the beginnings of the respective cycles in which detection occurs. Web alignment correction may be made each time detection occurs if correction is needed.

The periodically repeating pattern on the web may be an art design or printed words, for example, and the predetermined part of the pattern at which detection occurs may be an edge of an art figure or the top of a line of printed words, for example. The phrase "periodically repeating pattern" is also used to include a continuous pattern such as a continuous line running parallel to an edge of the web or such as an edge of the web itself.

An example will aid in visualizing the need for and the application of the hereinbefore described method of web alignment detection and control in the printing industry. A web of paper seventeen inches wide is traveling through a small rotary press for the purpose of printing manifold forms each seventeen by twenty-two inches in size and each designed to have an average margin of one inch all around the printed matter. All forms are alike and are normally spaced equidistantly along the web. After printing, the web passes through a cutter which operates once for each twenty-two inches of travel of the web at normal relative speed and thus the web is intended to be cut into sheets seventeen by twenty-two inches in size. It is assumed that the cutter is spaced at such a distance from the cylinder that the top and bottom margins are normally one inch in width. If the web does not unwind evenly from the roll it may not feed into the press along a straight line, but may wander with the result that the margins on either side of the web are not constant and of one inch width. A lateral alignment detector placed between the roll and the press may be used in connection with a corrector to suppress the wandering of the web so that the lateral margins are as nearly one inch as desired. If, after printing, the web for any reason does not travel at all times at the correct linear speed relative to the speed of the cutting mechanism, the top and bottom margins of the forms will not always be one inch wide. A longitudinal alignment detector placed between the printing cylinder and the cutting mechanism may be used in connection with a corrector to supply the necessary longitudinal displacements of the web so that the top and bottom margins of the forms are as nearly one inch as desired. Thus a great improvement in the appearance of the forms is obtained and it becomes possible to reduce the over-all size of the forms if desired, and thus to reduce the cost of stock because no allowance need be made for varying widths of margins to insure that no margin will be less in width than some required amount.

The preferred longitudinal alignment system for the present invention is illustrated in Figures 1 through 3 and 6 through 17, and will now be described. The principle of the preferred longitudinal alignment detecting system may be described as follows:

Periodically, at a frequency definitely related to the frequency or speed of some essential part of the printing press such as the rotation of the printing cylinder, for example, the web W is illuminated for a short interval of time by an intense source of light so that when viewed by the eye (or by a photoelectric cell) the web appears to be stationary except when lateral or longitudinal wandering occurs and in the latter event the only motion which is perceived is the wandering of the web. Such light sources are called "stroboscope" lamps, and the illusion of loss of main motion may be called "stroboscopic vision."

By means of a suitable optical system photoelectric cells are made to "view" the web during the intervals of illumination and hence to pass current in relation to the amount of light reflected or otherwise transmitted to said cells. For example, if the cells are on the same side of the web as the source of illumination, reflected light may be used to actuate the cells. As will be set forth in greater detail hereinafter, in this preferred embodiment of the invention two cells are used in an accurately balanced electrical circuit in such a way that if both cells receive amounts of light in predetermined ratio the balance is undisturbed and no signal is produced to control the correcting means and the balance is not affected by the magnitude of the illumination of the cell cathodes so long as the ratio remains constant and therefore is independent of the brightness of the source of light. The arrangement of the optical system may be such that one cell receives light reflected from an unprinted region 20 of the web while the other cell receives light reflected from a predetermined region which includes some unprinted and some printed area. If web wandering occurs in a manner to alter the ratio of printed area to unprinted area in said predetermined region it is clear that the resultant reflectivity of the said region will be changed and therefore that the relative amount of light reflected to the cell which views said region will be changed. Through the use of a circuit which will be described in detail hereinafter an unbalance in the photoelectric cell circuit caused by a relative decrease in the amount of light received by the cell which views the predetermined or "detection" region, as it will be called hereinafter, causes a signal to be generated and after suitable amplification to be sent to a part of the correcting means which is designed to produce a correction in one direction, whereas a relative increase in the amount of light received by said cell causes a suitably amplified signal to be sent to another part of the correcting means which is designed to produce a correction in a direction opposite to the aforesaid direction. Thus any web wandering of the kind which the detector is designed to detect such as longitudinal wandering for example, is detected and suitable signals are sent to the correcting means to supply not only a correction, but to give algebraic sign to the correction so that the correction may be applied in the proper direction to restore the web to its correct relative position.

It will be understood that since the periods of web illumination are short the photoelectric cell responses must necessarily be short and therefore the periods of unbalance of the photoelectric cell circuit when web wandering occurs are also short. As a consequence the signals which are to be amplified for the purpose hereinbefore set forth are of the nature of pulses and are known as transients. A transient may be considered for the purposes of the present discussion to be the equivalent of a single cycle of an alternating current, and although the frequency with which the transients occur may be as low as five per second, for example, the transient currents must be treated as though they were an alternating current of high frequency such as would obtain were they joined end to end with no appreciable gaps between. It is readily shown that when the light flashes of the stroboscope lamp are sufficiently brief to visually stop (reduce the motion during vision to, say, $\frac{1}{1000}$ inch) the main motion of a web traveling at 600 feet per minute, the fundamental frequency corresponding to the pulses produced in the photoelectric cell circuit is of the order of 120,000 cycles per second which, it is recognized, is within the range commonly known as "radio frequency." Consequently the photoelectric cell circuit and the circuits of the amplifiers should be designed to handle radio frequency currents and provision should be made to convert the short amplified pulses into longer pulses for controlling the correcting means or more specifically provision should be made for controlling the production of longer pulses of power for the operation of the electrical parts of the correcting means. It is evidently important that short flashes of light be used for the purpose and in the method thus far described it is at the same time advantageous because as a consequence continuously applied light such as strong daylight, for example, is without effect on the functioning of the detector and therefore, the detector and web may be used in any well lighted room in which other stroboscopic sources of light are not placed so as to illuminate the detection region on the web.

Since the frequency with which the light flashes occur is definitely related to and controlled by the speed of the press and the duration of a single flash is relatively short and because the photoelectric cell circuit and amplifier circuits are designed to handle radio frequency currents the detecting means functions at any speed at which the press can be operated. The correcting means is readily designed and constructed to function positively at speeds corresponding to the highest press speeds encountered today and may be equally readily designed and constructed to function positively at much higher speeds if desired. The combination comprising the detecting means and the correcting means may therefore be used to control the alignment of a web at any speed between zero and a value far in excess of any speed at which webs travel through printing presses.

Since stroboscopic vision, whether actually by eye or by electrical means, effectively stops the main motion of a moving object, the stroboscopic method of web alignment detection and correction may be explained in the following simple manner. Imagine a small printing press set-up of the type hereinbefore described for printing manifold forms and assume that means are provided for starting and stopping the press and hence the travel of the web at any desired instants. For convenience it may be assumed further that the press is being operated at such a low speed that no difficulty is encountered in stopping the press practically instantly. An index mark of some kind is provided on any convenient rotating part of the press which makes one revolution for each form printed and therefore during the travel of the web through a distance equal to the length of a whole form. The index mark sweeps past a reference line on a fixed member and the machine is stopped each time the index mark reaches the reference line. Now with the machine stopped in said position a second fixed member carrying a pointer is positioned so that the top of the pointer is exactly above and almost touching the web at the forward or leading edge of the printed area on the form, for example. Selection of the leading edge of the printed area, or any other convenient part of the printed form which is sufficiently distinctive, establishes the "predetermined part of a periodically repeating pattern" hereinbefore mentioned. Positioning the pointer above the leading edge of the printed area, for example, establishes the "predetermined index position" hereinbefore mentioned. Fixing the relationship between the index mark on the rotating member of the machine and the reference line on the corresponding fixed member establishes the "predetermined relative time" at which the predetermined part of a periodically repeating pattern is in a predetermined index position when the machine is operating correctly as hereinbefore described. Conditions are now perfect for detecting whether or not the machine is operating correctly insofar as longitudinal alignment is concerned. The next step in the simplified illustrative example is the assumption that suitable correcting means are provided for adding or subtracting web displacement, such as a take-up roll placed between the printing cylinder and the part of the press where the web passes under the pointer for alignment detection purposes, for example. If a take-up roll is used for the purpose indicated the correction may be applied through the turning of a hand wheel, for example, and the correction may be applied at once when the necessity for correction is noted or it may be applied gradually during the next cycle of operation of the press or during any number of subsequent cycles or in any other manner. For the sake of simplicity in this illustrative example, it may be assumed that the correction is applied at once when need for it is noted, although it is understood that said assumption has no bearing on the principle of the web alignment method and this example is intended only to illustrate said principle.

In this illustrative case, the press is run until the rotating member carrying the index mark has made exactly one revolution and is stopped with said index mark at the corresponding reference line. The operator notes the position of the leading edge of the printed area relative to the pointer provided and if coincidence does not obtain he turns the hand wheel of the correcting means until coincidence is established. The press is now run until the hereinbefore mentioned rotating member has made exactly one more revolution and thereafter the same detecting and correcting steps are taken as at the end of the preceding cycle, and so on until any desired number of forms have been printed. It is to be noted especially that no guesswork is involved in the detection of the longitudinal alignment of the web because the machine is stopped when examination of the web takes place. Precision in web alignment is attained because detection and correction take place at the end of each cycle and said precision can evidently be attained with greater ease and certainty if desired by dividing the cycle into parts and causing the detection and correction to "occur several times at predetermined relative time intervals during each cycle" as hereinbefore described. While it might not be convenient to stop the machine mechanically at the end of each predetermined period it is clear that no inconvenience results from stopping the motion "optically" or stroboscopically and it is also clear that the same detection end is attained as though the machine were stopped mechanically because the operator sees only web displacement and is not confused by the main motion or normal linear travel of the web. It is recognized that due to the high linear speed of travel of the web and to the fact that the web is not actually stationary at the times of detection some time lag may be expected to obtain between the instants of detection and the instants of application of the correction because no operator may be expected to have a zero reaction time and for other reasons which are obvious, but it is clear that since ordinarily webs are not likely to jump in relative position in a properly designed machine there is no need for sudden large corrections and therefore that the correction end is readily attained through gradual turning of the hereinbefore assumed hand wheel in one direction or the other in order to maintain the leading edge of the printed area under the pointer It is, therefore, clear that the stroboscopic method of web alignment detection is useful in connection with hand correcting means.

Continuing the illustrative example, the operator's eye may be replaced by photoelectric means of detection of a kind which examines the web at the predetermined times when the leading edge should be under the pointer and which differentiates between positive and negative displacements of the web at said predetermined times and sends out an electrical impulse or signal in accordance with the algebraic sign of the displacement if displacement obtains. Two bells of high and low pitch, for example, may be rung as a result of the signals produced because of positive and negative web displacements, respectively. Under these conditions the operator is relieved of the necessity for constant visual observation of the web and is free to perform other duties during periods when the web alignment is satisfactory and hence neither bell is ringing. Should web displacement occur, however, the audible signal tells the operator that correction is needed and there is no confusion in his mind regarding the sign of the correction required. It is clear therefore that photoelectric means in the stroboscopic method of web alignment detection is useful in connection with hand correcting means.

Continuing the illustrative example, the operator's hand may be replaced by electrical means of correction of a kind which responds to the signals generated by the photoelectric detector and which operates simultaneously with or in place of the bells hereinbefore described. The introduction of electrical correcting means not only relieves the operator of the necessity for turning the hereinbefore assumed hand wheel but also of the necessity for exercising judgment or otherwise giving thought to the matter under discussion. It is clear therefore that the stroboscopic method of web alignment detection is useful in connection with automatic means for correcting said alignment and that in common with other perfected automatic devices said automatic means may be expected to be an improvement over manual means for accomplishing the same end in that it will save time and labor and will perform the required function in a more satisfactory manner because human judgment is eliminated and for other reasons which are obvious.

The preferred form of longitudinal alignment detector of the present invention is illustrated diagrammatically in Figures 1 and 2. In Figure 1, the "periodically repeating patterns" 19 on the web W are shown as solid black lines of considerable thickness. It will be understood, of course, that in actual operation these regions 19 are only of the thickness of the printing ink, and may be made up of a large number of individually separate lines 18 (see Fig. 2).

Mounted as close as conveniently possible to the moving web W is a mask 40, an example of which is shown in plan view in Fig. 2. The mask 40 contains two apertures 41 and 42, which are normally, although not necessarily, of equal size. The shape of the apertures 41 and 42 is not important, although a square shape as shown simplifies the operation of the detector. In the exemplary mask shown, the apertures 41 and 42 are longitudinally displaced from each other, in the direction of travel of the web. As shown, the forward edge of the aperture 41 is on a line with the rear edge of the aperture 42, this arrangement representing minimum longitudinal separation of the two apertures. The apertures should be of such size, for example, that when the mask 40 is positioned over the moving web W, the aperture 41 is capable, at a given instant, of viewing a forward or leading edge of a printed region 19, and some considerable area behind said leading edge, as well as a portion of unprinted region 20, while at the same time the aperture 42 is capable of viewing only unprinted region 20. This requirement determines the size and spacing of the apertures 41 and 42, with relation to the arrangement of the printed matter on the web W, and, more particularly, to the dimensions of the printed regions and the unprinted regions.

Fig. 3 shows another exemplary arrangement of the mask 40, in which the aperture 41 is positioned to view a portion of the leading edge of a printed region, as well as a portion of unprinted region, while aperture 42 is positioned to view a portion of the trailing edge of a preceding printed region, as well as a portion of unprinted region. This arrangement is sometimes useful in attaining greater detector sensitivity, and for occasions where the character of the printed regions makes the unprinted regions narrow along the line of travel of the web.

Referring again to Fig. 1, numerals 43 and 44 indicate lenses that are suitably mounted with their optical axes preferably perpendicular to the web W, and passing through the central portions of the apertures 41 and 42, respectively. The lens 43 is arranged to focus an image of the portion of the web W as viewed through the aperture 41, upon the cathode of a photoelectric cell 45, while the lens 44 similarly focuses an image of the portion of web W viewed through aperture 42 on a photoelectric cell 46. The circuit connections of the photoelectric cells 45 and 46 will be described hereinafter.

Numeral 47 indicates diagrammatically a stroboscope lamp, which is so positioned with respect to the mask 40 and lenses 43 and 44, etc., that it illuminates the detected regions of the web W viewed through the apertures 41 and 42. The stroboscope lamp 47 may be any gaseous discharge tube which can be operated satisfactorily with the circuits and apparatus available and which delivers light of suitable quality and produces sufficient illumination for the purposes hereinbefore and hereinafter described. Fig. 6, for example, shows a stroboscope lamp 47 which I have used successfully in web alignment detection. In Fig. 6, numeral 48 indicates a U-shaped light-producing or "luminous" tube, one end of which is provided, interiorly, with a cold cathode 49, while the other end of which is provided with an anode 50. Both the cathode 49 and the anode 50 are sealed into the tube 48, with appropriate electrical leads extending therefrom.

The luminous tube 48 may have other forms than that shown in Fig. 6, if desired. For example, Fig. 7 shows a form of luminous tube 48 which has an increased light-emitting area, of generally rectangular shape, while Figures 8 and 9 show a luminous tube 48 in the form of a coil or spiral, to provide a light-emitting surface of generally circular shape.

The tube 48, whatever its form, is filled with a suitable gas at a suitable pressure such that an electrical discharge does not take place therethrough when the normal voltage is applied across the terminals of cathode 49 and anode 50. Numeral 51 indicates a so-called "trigger" electrode, which is in the form of a wire wrapped relatively loosely around the light-emitting portion of tube 48. The circuit connection for the trigger electrode 51 will be described hereinafter. A further characteristic of the gas filling for the tube 48 is that discharge will commence between cathode 49 and anode 50 when a suitable voltage is applied between the trigger electrode 51 and the cathode 49. Still a further characteristic is that afterglow in the tube 48 is either absent or negligibly weak in intensity. Stroboscope lamps 47, together with the necessary electrical apparatus for their operation, are manufactured and offered for sale on the open market.

One circuit which may be employed for supplying power to the stroboscope lamp 47 is shown in Fig. 10. Referring to Fig. 10, numeral 52 indicates a suitable power transformer, the primary 53 of which is connected to a suitable source of alternating current at a potential, say, of 110 to 115 volts. The opposite ends of the secondary 54 of the transformer 52 are connected to the anodes of two rectifier tubes 55 such as the so-called "type 866," the filamentary cathodes of which are supplied with power from the secondary of a transformer 55A, which has a center tap connected to the ground by a wire 56. A wire 57 taps the center of the secondary 54. Through the action of the rectifiers 55, full wave rectification of the transformed alternating current is had, and a direct potential is maintained between wires 56 and 57.

Numeral 58 indicates a resistor, which may preferably be of the order of 10,000 ohms. The wire 57 connects to one end of the resistor 58, while the other end is connected to a wire 59.

Numeral 60 indicates a condenser, which may suitably be of a high voltage type suitable for radio transmission, with a capacity of 1 to 2 microfarads. The condenser 60 is shunted across the wires 56 and 59.

The cathode 49 of stroboscope tube 47 is connected to the wire 59, while the anode 50 of stroboscope tube 47 is connected to the wire 56.

Numeral 61 indicates a network comprising a resistor 62 and a condenser 63 connected in parallel. The network 61 is in turn connected in series with a resistor 64, and the combination is shunted across wires 56 and 59. Resistor 62 has a value of the order of 1.5 megohms. Resistor 64 preferably has a value of the order of 50,000 ohms. Condenser 63 is preferably of the high voltage type, and has a capacity of the order of 0.01 microfarad.

Numeral 65 indicates an ignition-type spark coil, the primary 66 and secondary 67 of which are connected in series. At the point of connection between the primary 66 and the secondary 67, the spark coil 65 is connected to the wire 56. The other lead of the secondary 67 of the spark coil 65 is connected to the trigger electrode 51 of the lamp 47. The other lead of the primary 66 of the spark coil 65 is connected to the plate element, or anode 68, of a gaseous discharge tube 69 of the "Thyratron" type, for example, the so-called "type FG-17." The control grid 70 of the Thyratron 69 is connected to the intermediate point of a pair of series-connected resistors 71 and 72. The resistor 71 may preferably be of the order of 10,000 ohms, while the variable resistor 72 is preferably of the order of 100,000 ohms maximum, and is usually set at a value suited to the particular tube 47 used (for example, for one tube, a setting of 40,000 ohms was satisfactory). The opposite end of resistor 72 is connected to the wire 59, while the opposite end of resistor 71 is connected to a network 73 comprising a resistor 74 and a condenser 75 connected in parallel. The resistor 74 preferably has a value of the order of 2 megohms, while the condenser 75 preferably has a capacity of the order of 0.001 microfarad. The other end of the network 73 is connected to an electric switch 76 of the momentary contact variety, hereinafter to be explained in greater detail, while the other side of the switch 76 is connected to the wire 56. The end of wire 56 is grounded, as indicated at numeral 77.

Numeral 78 indicates the filamentary cathode of the thyratron 69, which is supplied with current from the secondary of a transformer 78A. A central tap of this secondary is connected to the intermediate point between the network 61 and the resistor 64.

The operation of the circuit as thus described is as follows:

The switch 76 closes the circuit through the network 73 and the resistances 71 and 72. At the instant of closing the switch 76 the condenser 75 of the network 73 begins to be charged and there being no potential drop across said condenser 75, the grid 70 is at a potential relative to the cathode 78 potential dependent on the ratio of the resistances of the resistors 71 and 72, and said ratio is such that said relative potential of the grid 70 is a high positive potential (whereas before said relative potential had been negative). The effect of the high positive potential is to produce sufficient ionization of the mercury vapor within the bulb of the thyratron tube 69 to start an electrical discharge through the vapor and therefore, the effect of said potential is to permit the condenser 63 of the network 61 to be discharged through the circuit comprising the thyratron tube 69 and the primary winding 66 of the spark coil 65, and the sudden discharge of said condenser causes a transient high potential to be supplied to the trigger electrode 51 by the secondary winding 67 of the spark coil 65. Said high potential acts on the gas in the lamp 47 to produce ionization sufficient to permit a discharge to occur through said gas between the electrodes 49 and 50, power for said discharge coming from the condenser 60, which has previously been charged through the resistance 58 by the power pack comprising the transformer 52 and the rectifiers 55. The resistance of the circuit comprising the lamp 47 and the condenser 60 is purposely of low value so that a high current flows in said circuit for a small fraction of a second during which time the charge in the condenser 60 is largely dissipated and, therefore, the potential across the terminals of the lamp 47 is insufficient to maintain the discharge through the lamp 47. During the brief interval of high current flow the lamp 47 emits light strongly, but the nature of the gas used in the lamp 47 is such that the light emission ceases substantially at the end of said high current flow. The current through the thyratron tube 69 flows through the resistor 64 after the discharge of the condenser 63, and therefore, produces a relatively high voltage drop across this resistor 64, and the effect of the voltage drop is to shift the potential of the cathode 78 in the direction to make the grid 70 relatively less positive. Substantially at the same time, the condenser 75 of the network 73 has become charged and hence for another reason the grid 70 becomes relatively less positive. It is clear, therefore, that the grid 70 remains at the high positive relative potential required for starting the discharge through the thyratron tube 69 for a short time only. When the condenser 60 has been discharged through the lamp 47, the discharge through the thyratron tube 69 stops and is prevented from starting again by the negative potential of the grid 70 relative to the cathode 78 which then obtains. The condenser 60 is recharged through the resistor 58. Opening the switch 76 permits the condenser 75 of the network 73 to discharge through its shunt resistor 74 and the apparatus is restored to the conditions requisite for causing the lamp 47 to flash.

The structure of the switch indicated diagrammatically at numeral 76 in Fig. 10, is indicated more completely in Figures 11 and 12. Referring to Figures 11 and 12, numeral 79 indicates a shaft, which is driven to rotate in a one-to-one ratio with a printing cylinder of the press. The shaft 79 is connected to rotate in a one-to-one manner with one of the printing cylinders because the "periodically repeating pattern" on the web W, which it is desired to inspect stroboscopically, will repeat at least once for each rotation of the cylinder, from which the shaft 79 may be driven.

Returning to Figures 11 and 12, numerals 86 indicate parallel discs secured to the shaft 79 by means of flanges 87 and set screws 88. The discs 86 may be made of any suitable material, such as metal, but they are provided around their peripheries with bands 89 of electrically insulating material. Each band 89 has an inlaid electrically conductive contact member or block 90. The blocks 90 of all of the discs 86 are connected together in series by means of flexible leads 91, which are all of sufficient length to permit any desired degree of angular adjustment of any of the discs 86.

Numeral 92 indicates a left-most disc, which is similar in shape to the discs 86, but which is provided around its entire periphery with an electrically conductive ring. In other words, for the disc 92, a ring analogous to the ring 89 is provided, but made entirely of electrically conductive material. A left-most flexible lead 93, similar in all respects to the leads 91, connects the contact block 90 on the left-most disc 86 to the electrically conductive periphery of disc 92.

Supported in stationary position above the shaft 79, and extending lengthwise over all of the discs 86 as well as the disc 92, are a pair of bars 94, which are made of electrically insulating material. Over each of the discs 86, and the disc 92 as well, the bars 94 support an arcuate piece 95 made of electrically conductive material. Numeral 96 indicates a slidable clamp or block that is positioned on each one of the arcuate bars 95, and numeral 97 indicates a set screw by which the clamp 96 may be secured at any desired angular position on the bar 95. Depending from the lower edge of the clamp 96 is a pivoted arm 98, which carries a brush member 99 at its end. The arm 98 is preferably spring pressed in order to maintain the brush 99 at all times in good electrical contact with the periphery of its respective disc. Each clamp 96 is also provided with a connecting lug 100. The lug for brush 99 which engages the left-hand end disc 92 is given the separate numeral 101.

It will be seen that the structure shown provides a plurality of individual switches connected in parallel arrangement. Each disc 86 constitutes a single switch, the connecting lug 101 constitutes one terminal for all of the switches, and individual connecting lugs 100 constitute the other terminals for the individual switches. For each disc 86, when the shaft 79 rotates, circuit is completed momentarily once for each rotation, at the moment that the respective brush 99 is in contact with its block 90. The peripheral surface of the block 90 is coextensive with the peripheral surfaces of the bands 89 so that the brush 99 does not move as the disc 86 rotates, and, therefore, the circuit is closed and opened only once during each revolution of the disc 86. The angular position of the block 90 on each disc 86, with relation to the shaft 79, may be adjusted in two manners, namely, first (and usually for a crude adjustment) by loosening the set screw 88 and rotating the disc 86 as a whole on the shaft 79, and finally, for a fine adjustment, by loosening the set screw 97 and moving the clamp 96 on the arcuate bar 95.

A multiple switch of the type disclosed in Figures 11 and 12 is particularly useful in connection with the present invention, as, normally, a number of alignment detectors are provided on the press as a whole, and all of these include stroboscope lamps which must be individually operated at the proper instant, although all operations depend upon or are synchronized with rotation of the press cylinder. Further, if the selected "periodically repeating pattern" recurs two or more times for one rotation of the press cylinder for any given longitudinal alignment detector, then the stroboscope lamp for that detector may be obliged to flash twice or more during each rotation of the cylinder, and for this purpose two or more of the discs 86, connected in parallel as a switch 76 in the circuit of Fig. 10, are used for one longitudinal alignment detector, and one switch is set for operation with each recurrence of the pattern at index position.

In starting the longitudinal alignment detector into operation for any given printing setup, the desired "periodically repeating pattern" on the web is first selected, and the relative angular position of the proper contact block 90 on the periphery of the respective disc 86 is then adjusted, by the means described, so that the stroboscope lamp is caused to flash at precisely the instant that said periodically repeating pattern appears in correct position under the mask 40 in the approximate position shown in Fig. 2, as hereinbefore described.

The electrical circuit whereby the light impulses received by the photoelectric cells 45 and 46 (Fig. 1) are converted into a useful control movement, is indicated diagrammatically in Figures 13 and 14. The circuit of Fig. 13 is divided into three general sections indicated, at the bottom of the figure, by index characters X, Y, and Z. Portion X will hereinafter be denominated as the detector and diode circuit; portion Y will be denominated as the amplifier circuit, and portion Z will be denominated as the output circuit. Portions X and Z are new with the present application, while portion Y constitutes, in effect, a pair of symmetrical resistance coupled amplifiers of two tubes (for example, "type 77") each, constructed in accordance with usual amplifier practice. In order, however, to show a completely operative circuit, the values for the various resistances, condensers, and the like, are shown in section Y of Fig. 13. No detailed description of said section Y will accordingly be given herein. It is to be understood that other types of amplifier circuits, of known design, may be substituted for the circuit shown as section Y of Fig. 13, within the present invention.

Referring to section X of Fig. 13, it will be seen that the two photoelectric cells 45 and 46 (which may be, for example, the so-celled "Visitron" gas-filled cells, "type 58A") are connected in series-aiding relationship with two resistors 102 and 103, and two batteries 104 and 105. The resistors 102 and 103 are each preferably of a value of the order of 50,000 ohms, while the batteries 104 and 105 are preferably of the order of 90 volts each, for the particular cells specified, although this voltage will of course depend upon the particular photoelectric cells used. The photoelectric cell 45 is preferably shunted by a condenser 106, while the photoelectric cell 46 is similarly shunted by a condenser 107. Condensers 106 and 107 preferably have a capacity of the order of 0.01 microfarad. The anode of photoelectric cell 45 is connected to a wire 108, while the anode of the photoelectric cell 46 is connected to a wire 109. The positive end of battery 105 is similarly connected to wire 108 while the positive end of the battery 104 is connected to wire 109. Shunted across between the wires 108 and 109 are a pair of resistances 110 and 111 individually connected in series. Each of the resistances 110 and 111, for example, has a value of the order of 1 megohm.

Numerals 112 and 113 indicate diode tubes of the two-element radio type. Cathodes 114 and 115 of the tubes 112 and 113 are connected, respectively, to wires 108 and 109.

Numeral 116 indicates a potentiometer, preferably of a total resistance of the order of 25,000 ohms, the ends of which are connected to the opposite terminals of a battery 117 (preferably 1.5 volts). The sliding contact of the potentiometer 116 is connected by a wire 118 to the connection between the two resistances 110 and 111. The negative side of the battery 117, and the respective negative end of the potentiometer 116, are grounded in the manner indicated.

Numerals 119 and 120 indicate the plates, or anodes, of the two diode tubes 112 and 113. These anodes 119 and 120 are connected, with suitable wires, to the input ends of amplifier section Y of Fig. 13.

The tubes 112 and 113 may conveniently be of the type known as "6H6," in which event only one set of cathode and anode elements of each tube are used. In the event that "type 6H6" tubes are used, their filaments are supplied with current by a suitable battery 121, in the manner indicated in section X of the circuit, Fig. 13, or by any other suitable means.

Numerals 122, 123, 124 and 125 indicate resistor elements that are connected in series and bridged across between the anodes 119 and 120 of the diodes 112 and 113. The central point between resistances 123 and 125 is grounded, as indicated. The resistances 122 and 124, which are preferably identical, preferably each have a value of the order of one-half megohm, while the resistances 123 and 125, which are likewise preferably identical, preferably each have a value of the order of one-tenth megohm.

In section X of Fig. 13 it will be noted that the photoelectric cells 45 and 46 are connected in series-aiding relationship with the batteries 104 and 105, and that the arrangement of the parts of the circuit is a symmetrical one. This photoelectric cell circuit is a balanced circuit in which similar parts, such as the cells 45 and 46, are selected to have nearly identical characteristics. When suitable light falls in equal amount on the two cells 45 and 46 a current flows in the balanced cell circuit and is substantially confined to said circuit. When light falls in unequal amounts on the two cells 45 and 46 some current flows through the resistors 110 and 111, thus producing a voltage drop in the resistors 110 and 111. Depending on the direction of the voltage drop through the resistors 110 and 111, some current flows through one or the other of the diodes 112 and 113 and hence through the resistors 122 and 123 or through the resistors 124 and 125. The direction of the voltage drop through the resistors 110 and 111 depends on which cell 45 or 46 receives the more light. Therefore, an unbalance in the light falling on the two cells 45 and 46 causes an electrical unbalance such that one or the other of the diodes 112 and 113 passes current and the resulting voltage drop in resistors 122 and 123 or in resistors 124 and 125 may be impressed across the control grid and cathode of an amplifier tube such as a "type-77" tube, for example, and said tube may be coupled to a second tube such as a "type-77" tube, for example, by resistance coupling, for example, all as shown in Fig. 13, section Y.

It is to be remembered that the detector and amplifier circuits hereinabove described are used for detecting unbalances in light flashes falling on the cells 45 and 46 and since said flashes are of short duration the periods of electrical unbalance are also short with the consequence that the currents which flow as a result of the light falling on the cells 45 and 46 are pulses or transients. This fact makes it possible to separate the stages of each of the two amplifiers including the final output stage, section Z, which will be described in greater detail hereinafter, in such a way that steady signals are not amplified by either amplifier as a whole, the separation being made by condensers, for example. Hence, steady light does not produce electrical disturbances which are amplified by either amplifier as a whole. Due to the fact that the pulses are so short it is advantageous to design the amplifiers with the same precautions against feed-back as are commonly employed in radio frequency amplifiers.

It is convenient to adopt the terms "negative pulse" and "positive pulse" to indicate voltage polarity according to the definition that a negative pulse is a pulse which is able to send a current through a diode 112 or 113. Whenever, due to light flash unbalance, a voltage drop appears across the resistors 110 and 111 of polarity such that the cathode of the diode 112 is negative with respect to the cathode of the diode 113, we say that a negative pulse has been impressed on the diode 112 and a positive pulse has been impressed on the diode 113, for example. Always a negative pulse impressed on one diode 112 or 113 is accompanied by a positive pulse impressed on the other diode 113 or 112, and in accordance with the definition current should flow through whichever diode 112 or 113 receives the negative pulse, but the other diode 113 or 112 should block the passage of current and this would be true were conditions ideal. In order to obtain the passage or blockage of current when the voltage pulse is negative or positive, respectively, it has been found in practice to be advantageous to introduce the potentiometer 116 and battery 117 substantially as shown in section X of Fig. 13 for the purpose of impressing a substantially constant positive biasing potential on the cathodes of both diodes 112 and 113. Without going into technical reasons and explanations it may be said that without the aforesaid introduction of the potentiometer 116 and battery 117 whichever diode 112 or 113 receives a positive pulse permits a signal to reach the corresponding amplifier at the beginning of the positive pulse and therefore, that the diodes 112 and 113 behave somewhat like gear trains in which the direction of rotation is controlled by a ratchet wheel and pawl and in which there is some backlash. In this analogy, the pawl permits free rotation in one direction and blocks rotation in the opposite direction, but blocks only after backlash has been taken up. It is believed that the function of the potentiometer 116 and battery 117 is to remove an electrical backlash within the diodes 112 and 113 resulting from a combination of effects and circumstances including contact differences of potential and the expected electron velocity distribution. The introduction of the potentiometer 116 and battery 117 effectively eliminates unwanted electrical backlash or "backwash," the latter term being better suited to a case where there is a flow of something such as the flow of electric current through a diode. But unless great care is exercised in the design and construction of the pulse amplifier, there may be an effect analogous to the ordinary feedback, in which voltages appear in parts of an input circuit due to currents flowing in an output circuit for example, and this effect may be designated as a "feedover." In a feedover, a current flowing in a part of one amplifier may cause a voltage to appear in an input circuit of the other amplifier and consequently the second amplifier may deliver a signal even though its input pulse is positive. The feedover effect is often difficult to distinguish from backwash, and it requires some ingenuity on the part of the builder to attain the end required, viz., pulse polarity selectively such that only the one correct amplified signal results from light flash unbalance.

As has heretofore been intimated, no detailed description of the amplifier section Y will be given herein, it being sufficient for present purposes to refer to the drawings and the values for the various circuit elements given thereon.

Numerals 126 and 127, respectively, indicate the output wires of the amplifier section Y, numeral 126 being the output wire from the amplifier handling photoelectric cell 45 and diode 112, while output wire 127 comes from the amplifier handling photoelectric cell 46 and diode 113. Entering circuit section Z, the wires 126 and 127 lead to condensers 128 and 129, respectively, these condensers preferably being identical and each having a capacity of the order of 0.001 microfarad. The other sides of condensers 128 and 129 are connected, respectively, to the grids 130 and 131 of Thyratron type tubes 132 and 133, respectively. These tubes 132 and 133 may be of the type known as "FG17," for example.

Also connected to the grids 130 and 131 are resistors 134 and 135, and the other ends of the resistors 134 and 135 are connected respectively to the sliding contacts of potentiometers 136 and 137. A battery 138 is connected across the potentiometers 136 and 137, and one end of the battery 138, as well as the potentiometers 136 and 137, is grounded, as indicated at numeral 139. The resistors 134 and 135 preferably each have a value of the order of 50,000 ohms; the potentiometers 136 and 137 preferably have a value of the order of 50,000 ohms and the battery 138 preferably has a potential of the order of 67 volts.

The filaments 140 and 141 of the Thyratron tubes 132 and 133 are supplied with power from a suitable outside source, hereinafter to be described, and are preferably shunted by a potentiometer resistance 142, the sliding contact 143 of which is grounded in the manner indicated.

The plates or anodes 144 and 145 of the Thyratron tubes 132 and 133 are respectively connected to the outside ends of magnet coils 146 and 147 of ratchet motors 148 and 149. The ratchet motors 148 and 149 may, for example, be of the type shown in Figures 15, 16 and 17, which illustrate the motor 148. The motor 148 comprises a frame 148A on one end of which is mounted the magnet coil 146. Near the other end of the frame 148A there is mounted a rotatable shaft 148B, which has fixed thereto a ratchet wheel 148C. A leaf spring 148D bearing on the edge of the wheel 148C acts as a sort of brake preventing overrunning of said wheel. A pair of brackets 148E at the magnet end of the frame 148A support a pin 148F on which is mounted a bar armature device 150. A spring 150A reacting between an arm 150B extending from armature 150, and the frame 148A, normally pulls the armature 150 away from the magnet 146. A relatively long arm 150C extends forwardly from the armature 150 and carries at its end a resilient pawl device 150D adapted to rotate the wheel 148C one tooth in a clockwise direction for each magnetically impelled movement of the armature 150. The arm 150C also carries at its end an upward projection 150E which serves as the actuating member to separate a pair of jack-like blade contacts 152 and 152A momentarily each time the armature 150 is magnetically impelled.

Other parts of the ratchet motor 148 are shown in Figures 15, 16 and 17, but need not be described herein.

Ratchet motor 149 may be of the same type as that described, except that it is preferably arranged to rotate its shaft in a counterclockwise, rather than a clockwise direction. For convenience in describing Fig. 13, however, the magnet of ratchet motor 149 is designated as 147, the armature as 151, and the contacts as 153 and 153A.

The contacts 152 and 153 are respectively connected to the other ends of magnet coils 146 and 147. The respective contact points 152 and 152A, and 153 and 153A, are bridged by means of a resistor 154 and a condenser 155 connected in series, in the one case, and a resistor 156 and a condenser 157 connected in series, in the other case. The resistors 154 and 156 preferably each have a value of the order of 150 ohms, while the condensers 155 and 157 preferably each have a capacity of the order of 2.0 microfarads. Contact points 152A and 153A are connected together at one end of a variable resistance 158, the other terminal of which, indicated by numeral 159, is connected to the positive terminal of a suitable direct current power source. The negative terminal of the same power source is grounded, as indicated at numeral 160.

Pulses or signals arrive via the condenser 128 or 129 and in passing to ground thorugh the resistor 134 or 135 produce a voltage drop in the resistor 134 or 135 and hence alter the relative potential of the grid 130 or 131 of the Thyratron 132 or 133. Each pulse fed to the Thyratron 132 or 133 is composed of two parts one of which makes the grid relatively more positive than normal. The normal relative potential of the grids 130 and 131 is fixed by the setting of the sliding contacts of the resistances 136 and 137 so that a small change in grid potential in the positive direction suffices to start the discharge in the Thyratron 132 or 133 provided sufficient voltage is applied between the plate and cathode of the Thyratron 132 or 133. The plate current of the Thyratron 132 or 133 flows through the winding of the magnet 146 or 147, thus causing motion of the armature 150 or 151, and said motion is used to impart rotatory motion to the ratchet wheel of the ratchet motor 148 or 149 for the purpose of supplying power to suitable web correcting means. Ratchet motors 148 and 149 operate in opposite directions but upon a common shaft. Said motion of the armature 150 or 151 also causes the armature 150 or 151 to break contact between the points 152 and 152A or 153 and 153A and therefore the discharge in the Thyratron 132 or 133 is stopped. When the armature 150 or 151 returns to its normal position, contact is made between the points 152 and 152A or 153 and 153A, but a discharge cannot take place in the Thyratron 132 or 133 because by this time the relative grid potential is no longer sufficiently positive to start the discharge. The condenser 155 or 157 and the resistor 154 or 156 connected as indicated are used to reduce sparking.

The necessity for breaking Thyratron circuits either actually or effectively arises from the fact that the grid loses control after the discharge has been started. The method which I have adopted for stopping the discharge in the Thyratron 132 or 133 has the important feature that it insures a flow of current, after the discharge has once been started, until the armature 150 or 151 has moved sufficiently to cause the ratchet wheel of the respective ratchet motor 148 or 149 to rotate through one step the contacts 152 and 152A or 153 and 153A being positioned so that the circuit is not broken before the armature 150 or 151 has moved through its entire range. Thus there is independence between the time length of a light flash and the time required for the armature 150 or 151 to perform its ordinary function.

The wave-form of a pulse resulting from light flash unbalance is affected by the constants of the balanced photoelectric cell circuit of Fig. 13 and may be altered by the introduction of the condensers 106 and 107, shunted across photoelectric cells 45 and 46, respectively, for example, and by various other means if desired. In any case an object is to obtain large signals at the grid 130 or 131 of the thyratron 132 or 133 with a minimum of feedback and feedover.

Fig. 14 illustrates a suitable power circuit for providing the power for the various elements of Fig. 13. It will be understood that any other suitable power circuit or circuits may be used, or, if desired, a combination of individual batteries may be used in place of the circuit shown in Fig. 14. Referring to Fig. 14, numerals 161 and 162 indicate wires that are connected to a suitable source of 110-volt, 60-cycle alternating current power, for example. Wire 162 leads to a pair of jointly acting switches 163, and then to the ends of primaries 164 and 165 of transformers 166 and 167, respectively. Wire 161 leads to the opposite ends of the two primaries 164 and 165. Transformer 166 delivers alternating current, reduced in voltage to a 2.5 volt value, for the filaments of the Thyratron tubes 132 and 133 of circuit section Z of Fig. 13. Transformer 167 is provided with three secondary windings indicated by numerals 169, 170, and 171, respectively. Secondary 169, a center tap of which is grounded, supplies alternating current power at a voltage of the order of 6.3 volts for the heaters or filaments of the "type 77" tubes of amplifier section Y of Fig. 13. A pilot light 172 is shown as shunted across the secondary 169, the pilot light serving to indicate that the transformer 167 is functioning properly. Secondary 171 supplies the filament 173 of a full wave-type rectifier tube 174, which may be of the type known as "type 80." The two plates 175 and 176 are connected to the opposite ends of the secondary 170. Rectified, high voltage current is therefore supplied between a wire 178, connected to the secondary 171, and a wire 177, which connects to a central point in the secondary 170. In order to smooth the direct current thus produced, a net-work comprising a 25-henry choke coil 179 and a pair of condensers 180 and 181, each having a capacity of the order of 8 microfarads, is provided. At the output end of the power circuit, a resistor 182, preferably of the order of 50,000 ohms, is shunted across between the output terminals 177 and 178. Normally, the terminals 177 and 178 beyond the resistance 182 are at a potential difference of the order of 250 volts, the terminal 178 being positive, and the terminal 177 being negative. In accordance with the practice in the circuit of Fig. 13, the negative terminal 177 is preferably grounded, in the manner indicated. The positive terminal 178 may be directly connected to the points indicated in the amplifier section Y of Fig. 13.

With the construction of the various elements of the longitudinal alignment detection system now more fully explained, the operation of said longitudinal alignment detection system will be more apparent. Returning, for the moment, to Fig. 2, it will be assumed that Fig. 2 shows a normal condition in which the web W is in proper longitudinal alignment. At this time, the photoelectric cell 45, looking at aperture 41, sees an amount of light which is conditioned by the presence, under part of the aperture 41, of printed matter, and under the remaining part of aperture 41 of unprinted web. In the meanwhile, the photoelectric cell 46, looking at aperture 42, sees an amount of light conditioned on there being only unprinted web W thereunder.

Dynamic balance in the photoelectric cell circuit X may now be obtained by moving the stroboscope lamp 47, Fig. 1, to such a position that the responses of the cells 45 and 46 are equal when the lamp 47 flashes, or any other suitable means may be employed, such as masking a portion of the aperture 42, for example. For reasons hereinbefore made clear, this means that, in the output section Z of Fig. 13, neither Thyratron 132 or 133 will operate, and hence neither ratchet motor 148 nor ratchet motor 149 will operate.

If a longitudinal misalignment occurs in such manner that the web W advances beyond its normal position at the time of the stroboscopic flash, then, at that instant, photoelectric cell 45, looking at aperture 41, will receive less light, because printed matter will occupy a relatively greater proportion of the area of aperture 41. Photoelectric cell 46, however, will still receive the same relative amount of light as formerly. This means that the balance of the photoelectric cell circuit, Fig. 13, will be destroyed, and photoelectric cell 46 will pass relatively more current the excess of which will flow through the resistors 110 and 111 applying a negative pulse to the diode 113. For the reasons hereinbefore given, this condition will cause operation of the Thyratron 133 and ratchet motor 149, and the common shaft of the two ratchet motors will be driven in one direction.

If longitudinal misalignment occurs in the opposite direction, a reverse set of factors will be encountered. The photoelectric cell 45 will now receive more light, because a relatively less proportion of the aperture 41 than normal will be obscured by printed matter. Since the photoelectric cell 45 now receives more light than normal, while cell 46 receives only a normal unchanged amount of light, the result is that the photoelectric cell circuit, Fig. 13, is unbalanced in the opposite direction. This means that the Thyratron 132 will be actuated, and it in turn will actuate its ratchet motor 148, to drive the common shaft in the reverse direction.

It is thus seen that longitudinal misalignments of the web W are effectively translated into rotation of a shaft which may be used for actuation of suitable web correcting means, and, furthermore, that the direction of rotation of the said shaft is dependent upon the direction of misalignment of the web. In other words, the conditions heretofore set forth as desirable have been fulfilled.

*Lateral alignment detectors*

It is quite feasible to provide a stroboscopic lateral alignment detector of the same general type as the preferred form of longitudinal alignment detector. Such a detector is indicated in diagrammatic form in Fig. 4, in which it will be seen that the mask 40 of Fig. 2 is now positioned in such a manner, over the web W, that aperture 41 views the edge or side of a printed region 19, while aperture 42 views an unprinted marginal portion of the web W. In other words, the mask 40 has been turned through an angle of 90° over its Fig. 2 position, and relocated over the side edge of a printed region, rather than the leading or trailing edge of said printed region. The optical system used in connection with the Fig. 4 embodiment is preferably the same as that shown in Fig. 1, and the stroboscopic illumination can well be provided through the use of the circuit of Fig. 10, the lamps of Figs. 6 through 9, and the timing device of Figures 11 and 12. The balanced photoelectric cell system of Fig. 13 may be used, and its action is now precisely the same as that heretofore described in connection with the preferred longitudinal web alignment detector, with the exception that the detection is now of a condition of lateral alignment.

Figure 5 shows an alternative form of mask 290, which extends the entire width of a printed region 19 on the web W. The mask 290 has two apertures 291 and 292 therein. Each aperture 291 and 292 is so positioned that it views, or permits to be viewed, a side edge of the printed region 19. In other words, looking from above, the printed region 19 occupies substantially half the area of each of the apertures 291 and 292, when the web W is in proper alignment. If this system of Fig. 5 is used together with an optical system such as that shown in Fig. 1, with the photoelectric cells 45 and 46 positioned so as to view the respective apertures 291 and 292, and the web is properly stroboscopically illuminated, as hereinbefore described, the two cells may be connected in a circuit of the type shown in Fig. 13, and used as a satisfactory lateral alignment detector. The relative positions of the web W and the apertures 291 and 292, as illustrated in Fig. 5, are for correct lateral alignment. It will readily be seen that if the web W wanders to the left, for example, the relatively highly reflecting (unprinted) area of web W under aperture 291 decreases, while the relatively highly reflecting (unprinted) region of web W under aperture 292 increases. This results in an unbalance of light falling on the two photoelectric cells, and a consequent action as heretofore described in connection with the circuit of Fig. 13. Similarly, wandering of the web W to the right results in increased light production through the aperture 291, and decreased light production through the aperture 292, to their respective photoelectric cells, in turn resulting in unbalance of the photoelectric cell circuit in the opposite sense.

It will be understood that with both the embodiments of Fig. 4 and Fig. 5, the stroboscopic illumination is synchronized with the movement of the web W, so that illumination takes place only upon the proper recurrence of a "periodically repeating pattern" on the web W under the mask 40 or 290, as the case may be.

*Definitions*

The word "web" as used herein, is meant to be inclusive of sheet-like material of any and all compositions. For example, the web may comprise paper, cloth, "Cellophane," metallic foils, rubber sheets, and the like.

The term "photoelectric cell," as used herein, is meant to be inclusive of any and all photosensitive or other radiation detecting devices, such as the so-called soft or gas-filled tubes, the so-called "electron multiplier" tubes, bolometers, "photolytic" cells, selenium cells, and like devices.

It may here be pointed out that photosensitive devices are essentially detectors of radiation. Thus, the radiations usable in the present invention are not confined to visible light rays, but may include infra-red rays and ultra-violet rays, providing these radiations are not harmful to the material of the web, and provided suitable radiation detectors are used. All of such radiations are comprehended to be within the scope of the term "light" as herein used.

The apparatus herein disclosed is claimed in certain of its broader aspects in the copending application of the present applicant Jones, and Donald C. Stockbarger, Serial No. 140,996, filed May 5, 1937.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In an alignment detector for a moving web having a periodically repeating pattern thereon, the provision of means for intermittently illuminating the said web as it passes a fixed point, the illumination being timed to coincide with the normal recurrence of said pattern on said web at said fixed point, and means for determining, during the intervals of illumination, whether or not said pattern is in correct alignment, said last-named means comprising a mask having a first aperture therein disposed to reveal a selected predetermined portion of a pattern when the pattern is in correct alignment, the said mask having a second aperture positioned to reveal a selected predetermined portion of said web lying outside said pattern when the web is in correct alignment, and a pair of photoelectric cells, one positioned to observe each aperture in said mask, said photoelectric cells being connected in a common circuit, said circuit being balanced in such manner that when said photoelectric cell observing said first aperture receives an amount of light therefrom in accordance with the revealment of said selected predetermined pattern portion and said photoelectric cell observing said second aperture receives an amount of light therefrom in accordance with the revealment of said selected predetermined web portion, the circuit has no effective power output, said circuit however producing a power output when one of said photoelectric cells, as a result of misalignment of said pattern or web, receives light either more than or less than the amount of light received by it when its aperture reveals its selected predetermined pattern or web portion, said circuit power output being of a different type for misalignment conditions producing excessive light at one of the photoelectric cells, than the type of power output for misalignment conditions producing less-than-normal light at said photoelectric cell, whereby said power output may be used to control the operation selectively of misalignment correcting means.

2. An alignment detector of the type set forth in claim 1, particularly adapted for longitudinal alignment detection, in which the said mask is positioned so that said first aperture reveals a longitudinal edge of said pattern on said web, while said second aperture reveals a portion of said web located longitudinally between successive patterns.

3. An alignmment detector of the type set forth in claim 1 particularly adapted for lateral alignment detection, in which the said mask is positioned to that said first aperture reveals a lateral edge of said pattern on said web, while said second aperture reveals a region of said web laterally outside the confines of said pattern.

4. An alignment detector of the type set forth in claim 1, in which the said mask is positioned so that said first aperture reveals one lateral edge of a pattern on said web, together with a non-patterned portion of web, while said second aperture reveals another lateral edge of a pattern, together with a non-patterned portion of web.

JOHN L. JONES.